J. M. FRINK.
Preparing Fuel.
No. 38,667. Patented May 26, 1863.
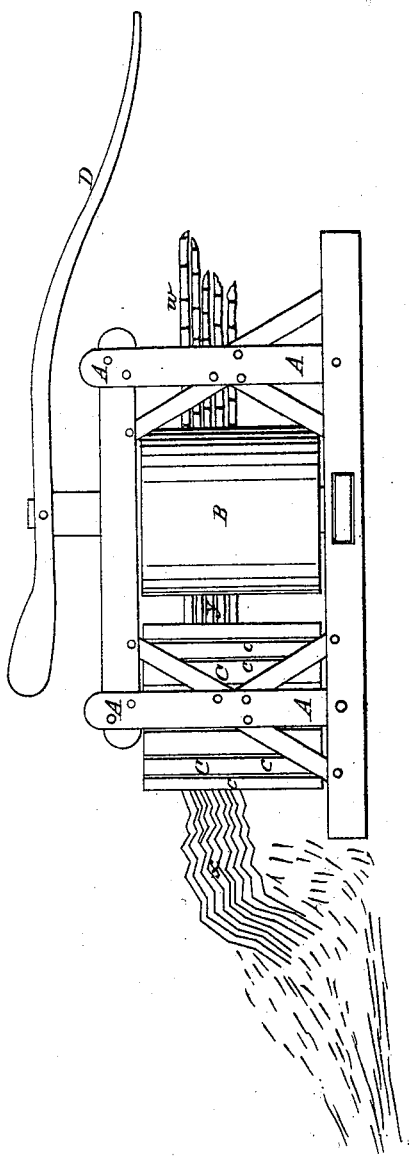
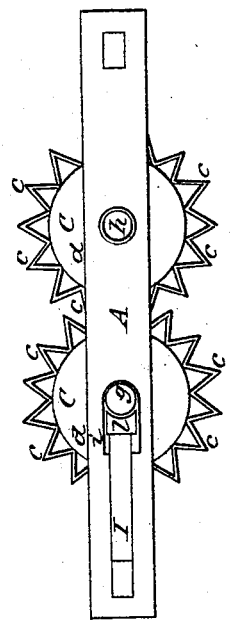
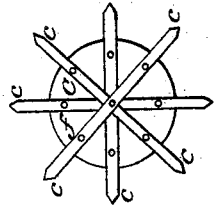
Witnesses:
J. C. Day
H. Sladman
Inventor:
Jonas M. Frink
By his Atty
J. S. Brown

UNITED STATES PATENT OFFICE.

JONAS M. FRINK, OF CORAL, ILLINOIS.

IMPROVEMENT IN PREPARING BAGASSE FOR FUEL.

Specification forming part of Letters Patent No. 38,667, dated May 26, 1863.

*To all whom it may concern:*

Be it known that I, JONAS M. FRINK, of Coral, in the county of McHenry and State of Illinois, have invented a new and useful Improvement in Preparing Bagasse for Burning; and I do hereby declare that the following is a full and exact description thereof, reference being had to the accompanying drawings, making part of this specification—

Figure 1 being a side elevation of an apparatus embodying my improvement; Fig. 2, a plan of the portion thereof to which my improvement pertains; Fig. 3, a view illustrating a modification of the construction.

Like letters designate corresponding parts in all of the figures.

Let B represent a mill for expressing the juice from the sugar-cane or sorghum, consisting, as shown in the drawings, of simple pressure-rollers, mounted in a suitable frame, A, and driven by a sweep or lever, D. Near these rollers, or their equivalent, I locate two rollers, C C, which have sharply-projecting wings or ridges c c, with deep flutes or spaces between them, substantially as shown. These wings and intermediate spaces may be formed in any suitable manner, one being represented in Fig. 2. It consists in surrounding a central cylinder, d, of wood with corrugated or crimped sheet metal, nailed or otherwise fastened to the cylinder, and composing the wings and spaces. Another method of constructing is indicated in Fig. 3, and consists of planks or boards arranged in radial wings c c, sharpened at the outer edges, and held together by cast-iron flanges f at the ends. A pair of these winged rollers, arranged substantially as represented in Fig. 2, constitute the peculiar mechanism by which the stalks of bagasse are prepared. The rollers are placed so as to have their wings loosely match together like the teeth of cog-wheels, the shaft g of one of them playing in slotted bearings i in the frame, so that the roller may move toward or from the other roller. This shaft, either with or without intervening bearing-blocks l, is pressed toward the other roller with the necessary force by springs I. The shaft h of the other roller may preferably be without this self-adjusting movement, since it is sufficient to have one yield. Thus arranged, when the stalks w w of cane pass through the pressure-rollers B, being flattened thereby, as seen at y, Fig. 1, they pass directly between the intermatched wings of these rollers C C, (no other power than the pushing action of the pressure-rollers B B on the stalks themselves being required to turn the rollers,) and are thereby partially broken and crimped into zigzag form, as indicated at x, Fig. 1, in which shape they remain and are allowed to dry. When sufficiently dried to be burned, these crimped stalks are in a shape to be successfully burned in a suitable furnace, since they keep lightened up while burning, so as to allow the free ingress of the air to support complete combustion, whereas, if left straight, as they ordinarily come from the pressing-mill, they pack closely together and are burned with great difficulty, and are consequently nearly worthless for the purpose, in evaporating the cane-juice.

What I claim as my invention, and desire to secure by Letters Patent, is—

Crimping the stalks of bagasse between winged rollers C C, or their equivalents, so as to prepare them for burning, substantially as herein specified.

JONAS M. FRINK.

Witnesses:
F. SAFFORD,
IRA BOZEL CURTIS.